United States Patent
Jain et al.

(10) Patent No.: US 11,070,474 B1
(45) Date of Patent: Jul. 20, 2021

(54) SELECTIVE LOAD BALANCING FOR SPRAYING OVER FABRIC PATHS

(71) Applicant: Juniper Networks, Inc., Sunnyvale, CA (US)

(72) Inventors: Piyush Jain, New Delhi (IN); Anuj Kumar Srivastava, Bangalore (IN); Naveen K Jain, Bangalore (IN); Dinesh Jaiswal, Bangalore (IN); Harshad B Agashe, Pune (IN)

(73) Assignee: Juniper Networks, Inc., Sunnyvale, CA (US)

( * ) Notice: Subject to any disclaimer, the term of this patent is extended or adjusted under 35 U.S.C. 154(b) by 186 days.

(21) Appl. No.: 16/166,944

(22) Filed: Oct. 22, 2018

(51) Int. Cl.
*H04L 12/937* (2013.01)
*H04L 12/803* (2013.01)
*H04L 12/933* (2013.01)
*H04L 12/741* (2013.01)

(52) U.S. Cl.
CPC ........ *H04L 47/125* (2013.01); *H04L 49/1515* (2013.01); *H04L 49/254* (2013.01); *H04L 45/74* (2013.01); *H04L 49/1569* (2013.01)

(58) Field of Classification Search
CPC ....... G06F 8/34; H04L 49/252; H04L 49/205; H04L 49/3018; H04L 49/3027; H04L 49/503; H04L 45/16; H04L 47/18; H04L 47/52; H04L 12/4633; H04L 47/15; H04L 69/26; H04L 45/42; H04L 45/64; H04L 69/324; H04L 49/25
See application file for complete search history.

(56) References Cited

U.S. PATENT DOCUMENTS

| | | | |
|---|---|---|---|
| 7,102,999 B1 | 9/2006 | Sindhu et al. | |
| 7,215,637 B1* | 5/2007 | Ferguson | H04L 45/00 370/230.1 |
| 7,304,987 B1* | 12/2007 | James | G06F 8/34 370/360 |
| 8,050,559 B2 | 11/2011 | Sindhu | |
| 9,806,994 B2* | 10/2017 | Haramaty | H04L 45/24 |
| 2003/0058848 A1* | 3/2003 | Dally | H04Q 11/0478 370/360 |
| 2007/0189283 A1* | 8/2007 | Agarwal | H04L 47/125 370/388 |
| 2008/0044181 A1* | 2/2008 | Sindhu | H04J 14/0267 398/49 |
| 2008/0259798 A1* | 10/2008 | Loh | H04L 45/302 370/235 |

(Continued)

*Primary Examiner* — Aftab N. Khan
(74) *Attorney, Agent, or Firm* — Shumaker & Sieffert, P.A.

(57) ABSTRACT

A network device includes a memory, a plurality of packet processors, a switch fabric coupling the plurality of processors, and processing circuitry. The processing circuitry is configured to receive a data stream to be transmitted on a switch fabric and determine a plurality of credit counts, each credit count being assigned to a respective subchannel of a plurality of subchannels. The packet processor is further configured to determine per-subchannel occupancy of the memory for the plurality of subchannels, select, based on the plurality of credit counts and the per-subchannel occupancy of the memory, a subchannel of the plurality of subchannels for transmitting a cell of a plurality of cells for the data stream, and output data for the cell to the memory for output by the selected subchannel.

18 Claims, 10 Drawing Sheets

(56) References Cited

U.S. PATENT DOCUMENTS

| | | | |
|---|---|---|---|
| 2013/0114619 A1* | 5/2013 | Wakumoto | H04L 45/24 370/406 |
| 2013/0242745 A1* | 9/2013 | Umezuki | H04L 47/125 370/236 |
| 2014/0153570 A1* | 6/2014 | Balakavi | H04L 45/245 370/390 |
| 2015/0194215 A1* | 7/2015 | Douglas | H04L 45/7453 711/108 |
| 2019/0104206 A1* | 4/2019 | Goel | H04L 45/16 |
| 2019/0260824 A1* | 8/2019 | Pitio | H04L 47/283 |
| 2020/0050391 A1* | 2/2020 | Meyerowitz | G06F 3/0617 |

\* cited by examiner

SELECTIVE LOAD BALANCING FOR SPRAYING OVER FABRIC PATHS

TECHNICAL FIELD

The disclosure relates to computer networks and, more particularly, to communicating packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

A variety of types of routers exist within the Internet. Network Service Providers (NSPs), for example, maintain "edge routers" to provide Internet access and other services to the customers. Examples of services that the NSP may provide include Voice over IP (VoIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers, and are designed to handle high volumes of network traffic.

In some examples, a core router or another router or switching device may employ a distributed, multi-stage switch fabric architecture, in which network packets traverse multiple stages of the switch fabric located in distributed forwarding components of the router to travel from an ingress point of the switch fabric to an egress point of the switch fabric. As one example, a switch fabric may be implemented as a single multi-stage Clos switch fabric, which relays packets across the stages of the switch fabric. A typical multi-stage Clos switch fabric has a plurality of switches interconnected to form a plurality of stages.

SUMMARY

In general, techniques are described for load balancing data to be transmitted over different fabric paths of a switch fabric in a network device. For example, data may be transmitted over different subchannels that each correspond to a respective fabric path across a switch fabric to a fabric endpoint of the switch fabric. In some examples, data transmitted over different subchannels may be forwarded by different fabric planes and/or through different stages of a common fabric plane to a fabric endpoint of the switch fabric.

More specifically, for example, techniques are directed to selectively spraying data to subchannels that are not overutilized, to improve switch fabric utilization and avoid oversubscribing subchannels. In some examples, a network device may be configured to maintain per-subchannel occupancy of shared memory across fabric endpoints. When each per-subchannel occupancy of shared memory is less than an occupancy threshold ('T'), the network device equally sprays the data for the single fabric endpoint in a round-robin manner to the subchannels. However, when a per-subchannel occupancy of shared memory is greater than the occupancy threshold ('T'), the network device equally sprays the data for the single fabric endpoint in a round-robin manner to the subchannels that do not have an occupancy of shared memory that is greater than the occupancy threshold ('T').

The techniques may include selecting, by the network device, a subchannel using a low priority round-robin spraying technique. As an incoming data stream may include portions of data referred to herein as "cells" having different sizes, the network device may maintain a credit count on a per subchannel, per switch fabric destination (e.g., fabric endpoint) basis. For example, the network device assigns cells of an incoming data stream to be output to an egress fabric endpoint until the credit count exceeds an amount of offsetting transmission credits for the subchannel, which may be referred to herein as a "greater than zero vector." Once the subchannel receives credit counts to make a greater than zero vector, the network device may select another subchannel in a round that does not have a greater than zero vector. If the network device determines that all subchannels have a greater than zero vector, then the network device may replenish all the subchannels credit counts and the process repeats.

To help to avoid overutilizing subchannels, a network device may select a subchannel using a high priority round-robin spraying technique. In the high priority round-robin spraying technique, the network device assigns cells of an incoming data stream to be output to an egress fabric endpoint until the credits exceed an amount of offsetting transmission credits for the subchannel similarly to the low priority round-robin spraying technique. However, when using the high priority round-robin technique, once the subchannel receives credits to make a greater than zero vector, the network device selects another subchannel that does not have a greater than zero vector and that does not have an occupancy of shared memory that is greater than the occupancy threshold value ('T'). In this way, the network device may select a subchannel that sprays the data for the single switch endpoint in a round-robin manner that is relatively evenly distributed while ensuring that a subchannels are not oversubscribed.

An example method includes: receiving, by processing circuitry of a network device, a data stream to be transmitted on a switch fabric of the network device, the switch fabric coupling a plurality of packet processors to a plurality of fabric endpoints of the switch fabric; determining, by the processing circuitry, a plurality of credit counts, each credit count being assigned to a respective subchannel of a plurality of subchannels, each subchannel of the plurality of subchannels corresponding to a respective fabric path through the switch fabric from an ingress fabric endpoint to an egress fabric endpoint of the plurality of fabric endpoints; determining, by the processing circuitry, per-subchannel occupancy of a memory for the plurality of subchannels; selecting, by the processing circuitry and based on the plurality of credit counts and the per-subchannel occupancy of the memory, a subchannel of the plurality of subchannels for transmitting a cell of a plurality of cells for the data stream; and outputting, by the processing circuitry, data for the cell to the memory for output by the selected subchannel.

In some examples, a network device includes: a memory; a plurality of packet processors; a switch fabric coupling the plurality of packet processors to a plurality of fabric endpoints of the switch fabric; and processing circuitry configured to: receive a data stream to be transmitted on the switch fabric; determine a plurality of credit counts, each credit count being assigned to a respective subchannel of a plurality of subchannels, each subchannel of the plurality of subchannels corresponding to a respective fabric path through the switch fabric from an ingress fabric endpoint to an egress fabric endpoint of the plurality of fabric endpoints; determine per-subchannel occupancy of the memory for the plurality of subchannels; select, based on the plurality of credit counts and the per-subchannel occupancy of the memory, a subchannel of the plurality of subchannels for transmitting a cell of a plurality of cells for the data stream; and output data for the cell to the memory for output by the selected subchannel.

In some examples, a computer-readable storage medium includes instructions for causing processing circuitry of a network device to: receive a data stream to be transmitted on a switch fabric of the network device, the switch fabric coupling a plurality of packet processors to a plurality of fabric endpoints of the switch fabric; determine a plurality of credit counts, each credit count being assigned to a respective subchannel of a plurality of subchannels, each subchannel of the plurality of subchannels corresponding to a respective fabric path through the switch fabric from an ingress fabric endpoint to an egress fabric endpoint of the plurality of fabric endpoints; determine per-subchannel occupancy of a memory for the plurality of subchannels; select, based on the plurality of credit counts and the per-subchannel occupancy of the memory, a subchannel of the plurality of subchannels for transmitting a cell of a plurality of cells for the data stream; and output data for the cell to the memory for output by the selected subchannel.

In some examples, a device includes: means for receiving a data stream to be transmitted on a switch fabric of a network device, the switch fabric coupling a plurality of packet processors to a plurality of fabric endpoints of the switch fabric; means for determining a plurality of credit counts, each credit count being assigned to a respective subchannel of a plurality of subchannels, each subchannel of the plurality of subchannels corresponding to a respective fabric path through the switch fabric from an ingress fabric endpoint to an egress fabric endpoint of the plurality of fabric endpoints; means for determining per-subchannel occupancy of the memory for the plurality of subchannels; means for selecting, based on the plurality of credit counts and the per-subchannel occupancy of the memory, a subchannel of the plurality of subchannels for transmitting a cell of a plurality of cells for the data stream; and means for outputting data for the cell to the memory for output by the selected subchannel.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
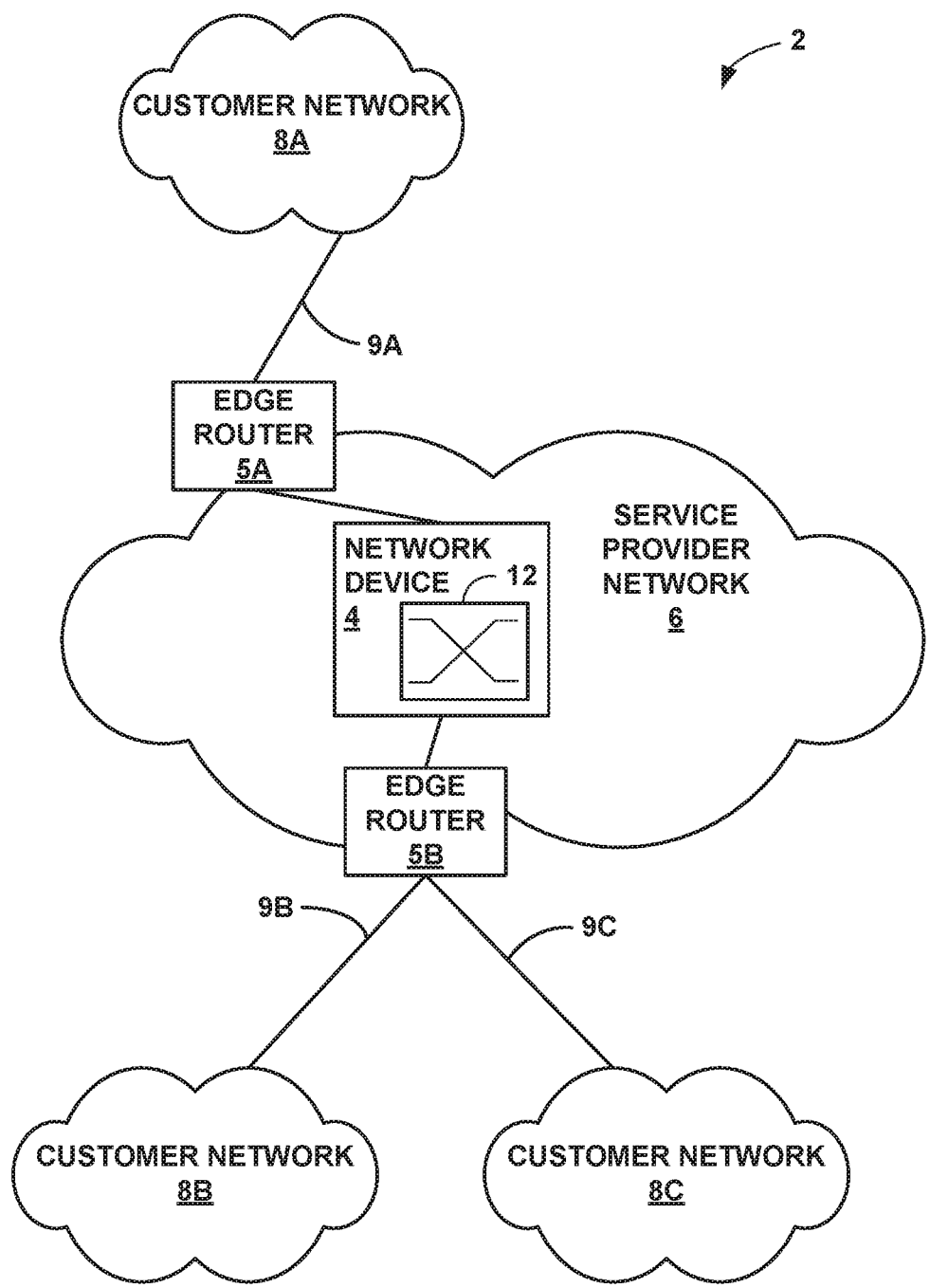
FIG. 1 is a block diagram illustrating an example network environment in which a service provider network includes a network device configured to selectively load balance incoming network traffic across switch fabric subchannels according to techniques described herein.

FIG. 1 is a block diagram illustrating an example network environment in which a service provider network includes a network device configured to selectively load balance incoming network traffic across switch fabric subchannels according to techniques described herein. For purposes of example, the principles of this disclosure are described with respect to a simplified network environment 2 of FIG. 1 in which network device 4 communicates with edge routers 5A and 5B ("edge routers 5") to provide customer networks 8A-8C ("customer networks 8") with access to service provider network 6. Network device 4 may represent a router that exchanges routing information with edge routers 5 in order to maintain an accurate representation of the topology of network environment 2. Network device 4 may consist of a plurality of cooperative routing components operating as a single node within service provider network 6. Network device 4 may alternatively represent an L2 and/or L3 switch, or any other device that includes an internal switching fabric for internally switching packets among fabric endpoints of the device.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. In another example, service provider network 6 may provide network services within the core of the Internet. In either case, service provider network 6 may include a variety of network devices (not shown) other than network device 4 and edge routers 5, such as additional routers, switches, servers, or other devices.

In the illustrated example, edge router 5A is coupled to customer network 8A via access link 9A, and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, workstations, servers, switches, printers, customer data centers or other devices. The configuration of network environment 2 illustrated in FIG. 1 is merely an example. Service provider network 6 may be coupled to any number of customer networks 8. Nonetheless, for ease of description, only customer networks 8A-8C are illustrated in FIG. 1. Many different types of networks besides service provider network may employ an instance of network device 4, including customer/enterprise networks, transport networks, aggregation or access networks, and so forth.

Network device 4 may include multiple chassis (not shown in FIG. 1) that are physically coupled and configured to operate as a single router. In such examples and to edge routers 5 of network environment 2, network device 4 appears as a single routing device. For example, although network device 4 may include a plurality of chassis, from the perspective of peer routers 5, network device 4 has one or more unified host network addresses and maintains single peer routing sessions for each routing protocol maintaining peer routing sessions with each of the edge routers 5. Additional details regarding an example of a multi-chassis router having a multi-stage switch fabric are found in Pradeep S. Sindhu, U.S. Patent Publ. No. 2008/0044181 A 1, entitled "Multi-chassis router with multiplexed optical interconnects" and published Feb. 21, 2008, which is incorporated by reference in its entirety.

As described in further detail below, network device 4 forwards packets, i.e., network traffic, on a data plane of network device 4 using an internal switch fabric 12 that interconnects fabric endpoints within the network device, the fabric endpoints themselves connected to network interface cards (e.g., port interface cards) of the network device. In other words, fabric endpoints in communication with the network interfaces switch packets to one another via the switch fabric 12. In the example of FIG. 1, the switch fabric 12 switches data units from ingress fabric endpoints in communication with ingress ports of the network interface cards to the egress fabric endpoints in communication with egress ports of the network interface cards to perform high-speed packet forwarding among the forwarding units of the network device 4. In some examples, switch fabric 12 may be a multi-stage switch fabric. For example, switch fabric 12 may represent a 3-stage Clos network, a 5-stage Clos network, or an n-stage Clos network for any value of n. Fabric endpoints can be an ingress fabric endpoint for a given packet and an egress fabric endpoint for another given packet. In some examples, switch fabric 12 may be a single-stage switch fabric.

In general, fabric endpoints divide packets received at an ingress port into one or more fixed-length cells for switching. However, in some instances, packets may be divided into variable-length data units for switching or switched intact as respective data units. A "data cell" or "cell" refers to a smallest block of data that is passed through switch fabric 12. The cell includes a header portion and a data portion. "Cell data" refers to data contained within a data portion of a cell. The header portion includes at least a source identifier indicating the ingress fabric endpoint of the cell and a sequence number. As used throughout this description unless specifically indicated otherwise, "cell" may refer to any unit of data switched by switch fabric (e.g., a multi-stage switch fabric).

A switch fabric sprays packets among multiple fabric paths. Typically, each fabric path is able to use the switch fabric to reach and send packets to any other fabric endpoint connected to the switch fabric. For example, a switch fabric sprays (e.g., sends) a single stream of data over multiple fabric subchannels to a single fabric endpoint. That is, a single ingress fabric endpoint may send data to a single egress fabric endpoint via multiple different fabric subchannels. In one example, the switch fabric equally sprays the data for the single fabric endpoint in a round-robin manner to 36 subchannels. In this example, each subchannel of the switch fabric reads data stored in shared memory for the respective subchannel at a fixed rate and outputs the data to the fabric endpoint. Data for different fabric endpoints may be equally sprayed in a round-robin manner by the switch fabric to 36 subchannels at the shared memory in a similar manner. Because data for different fabric endpoints may align on a particular subchannel, shared memory used by the particular subchannel may prevent other subchannels from using the shared memory, which may cause subchannels to cease outputting data to the fabric endpoint.

In accordance with techniques described herein, network device 4 is configured to selectively load balance incoming network traffic across switch fabric subchannels. The techniques may help to eliminate "head of line" blocking of subchannels, which may increase an amount of data that may be transmitted by network device 4. Accordingly, network device 4 may transmit data faster than network devices that do not selectively load balance incoming network traffic across switch fabric subchannels, which may reduce power consumption of network device 4 compared to network devices that do not selectively load balance incoming network traffic across switch fabric subchannels. In some examples, the techniques may help to use memory and hardware resources more efficiently than network devices that do not selectively load balance incoming network traffic across switch fabric subchannels. Moreover, the foregoing advantages may be even more useful and more scalable when a number of forwarding components is high. In the example of FIG. 1, network device selectively load balances incoming network traffic across switch fabric subchannels. However, in other examples, edge router 5A and/or edge router 5B may selectively load balances incoming network traffic across switch fabric subchannels.

Figure 2:
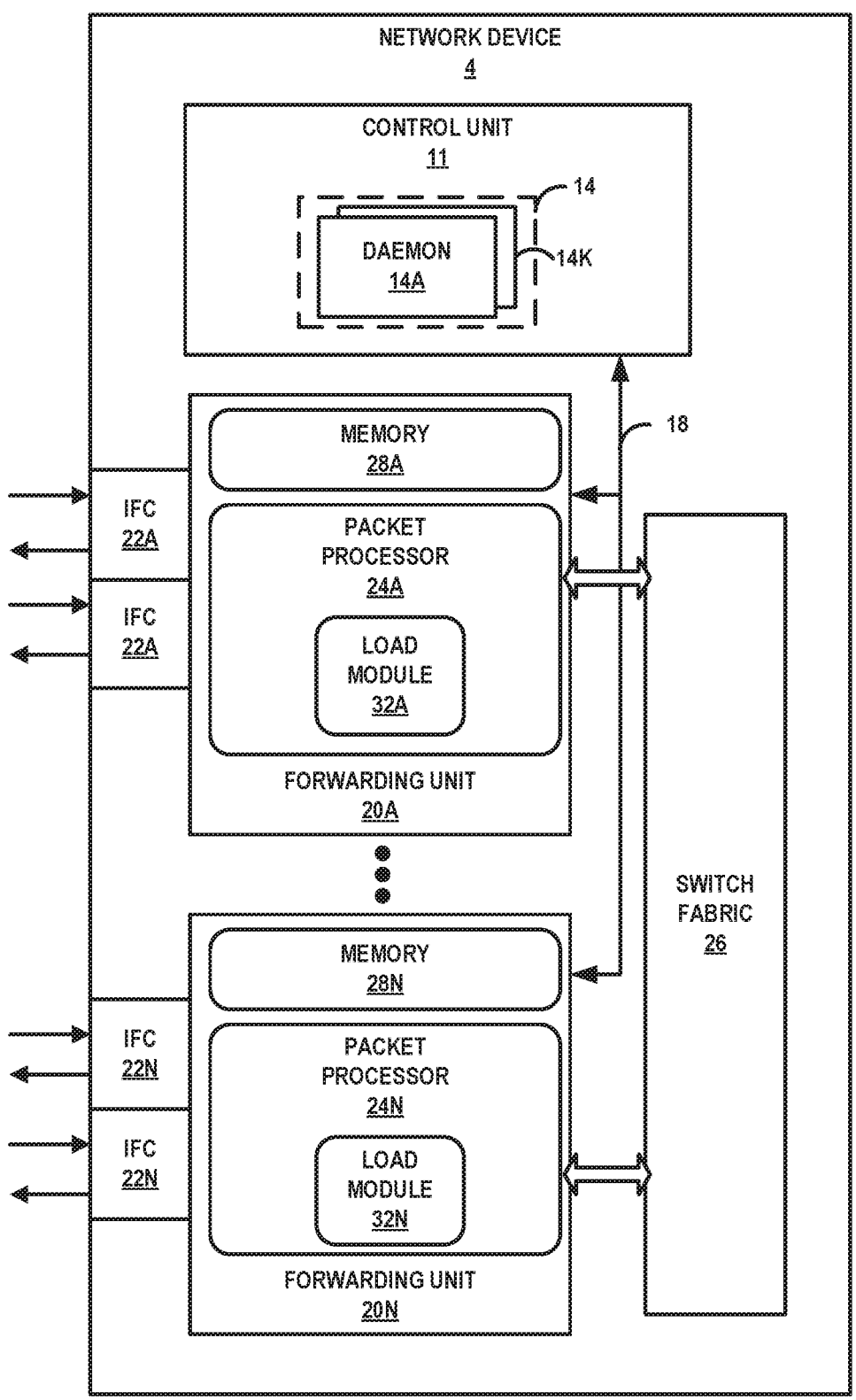
FIG. 2 is a block diagram illustrating an example network device configured to selectively load balance incoming network traffic across switch fabric subchannels according to techniques described herein.

FIG. 2 is a block diagram illustrating an example network device 4 that is configured to selectively load balance incoming network traffic across switch fabric subchannels, according to techniques described herein. Network device 4 may include a router such as a provider edge or customer edge router, a core router, or another type of network device, such as a switch. In this example, network device 4 includes a control unit 11 that provides control plane functionality for the device. Network device 4 also includes a plurality of forwarding units 20A-20N ("forwarding units 20") and a switch fabric 26 that together provide a data plane for processing network traffic.

Forwarding units 20 receive and send data packets via interfaces of interface cards 22A-22N ("IFCs 22") each associated with a respective one of forwarding units 20.

Each of forwarding units 20 and its associated ones of IFCs 22 may represent a separate line card insertable within a chassis (not shown) of network device 4. IFCs 22 may be referred to throughout this disclosure as one or more network interfaces. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may include more or fewer IFCs. Switch fabric 26 provides a high-speed interconnect among forwarding units 20 for forwarding incoming data packets to an egress forwarding unit of forwarding units 20 for output over a network that includes network device 4.

Control unit 11 is connected to each of forwarding units 20 by internal communication links 18. Internal communication links 18 may include a 100 Mbps Ethernet connection, for instance. Control unit 11 configures, by sending instructions and other configuration data via internal communication link 18, forwarding units 20 to define control processing operations applied to packets received by forwarding units 20.

Control unit 11 executes a plurality of applications, including daemons 14A-14K ("daemons 14"). Each of the applications may represent a separate process managed by a control unit operating system. Daemons 14 may represent user-level processes that are developed and deployed by the manufacturer of the network device 4. As such, daemons 14 are "native" to the network device 4 in that the development of the applications is carefully managed by the manufacturer to facilitate secure, robust, and predictable operation of the network device 4, such operation defined at least in part according to a configuration specified by an operator (e.g., a service provider, enterprise, or other customer of the network device 4 manufacturer). Daemons 14 may run network management software, execute routing protocols to communicate with peer routing devices, maintain and update one or more routing tables, and create one or more forwarding tables for installation to forwarding units 20, among other functions.

Control unit 11 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 11 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 20 includes at least one packet processor 24 that processes packets by performing a series of operations on each packet over respective internal packet forwarding paths as the packets traverse the internal architecture of network device 4. Packet processor 24A of forwarding unit 20A, for instance, includes one or more configurable hardware chips (e.g., a chipset) that, when configured by applications executing on control unit 12, define the operations to be performed by packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 20 may include one or more packet processors 24.

Operations may be performed, for example, on each packet by any of a corresponding ingress interface, an ingress forwarding unit 20, an egress forwarding unit 20, an egress interface or other components of network device 4 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. The result of packet processing determines the manner in which a packet is forwarded or otherwise processed by packet processors 24 of forwarding units 20 from its input interface on one of IFCs 22 to, at least in some cases, its output interface on one of IFCs 22.

In the example of FIG. 2, packet processors 24 include respective load modules 32A-32N ("load modules 32") to selectively load balance incoming network traffic across switch fabric subchannels according to techniques described herein. Initially, load module 32A receives a data stream to be transmitted from IFCs 22 to switch fabric 26. In some examples, switch fabric 26 may include a plurality of fabric planes, each fabric plane of the plurality of fabric planes having a plurality of stages to switch data units between any of a plurality of fabric endpoints.

Load module 32A determines credit counts assigned to each subchannel to a fabric endpoint. Load module 32A determines per-subchannel occupancy of hardware (HW) memory 28A (or simply "memory 28A") for the plurality of subchannels. Load module 32A selects, based on the credit counts and the per-subchannel occupancy of memory 28A, a subchannel for transmitting a cell for a data stream to be transmitted from IFCs 22 to switch fabric 26. Load module 32A may continue to assign subchannels for transmitting a cell until all of the data stream has been assigned to the subchannels. While load module 32A selectively load balanced incoming network traffic across switch fabric subchannels in this example, any combination of load modules 32 may be configured to selectively load balance incoming network traffic across switch fabric subchannels.

Figure 3:
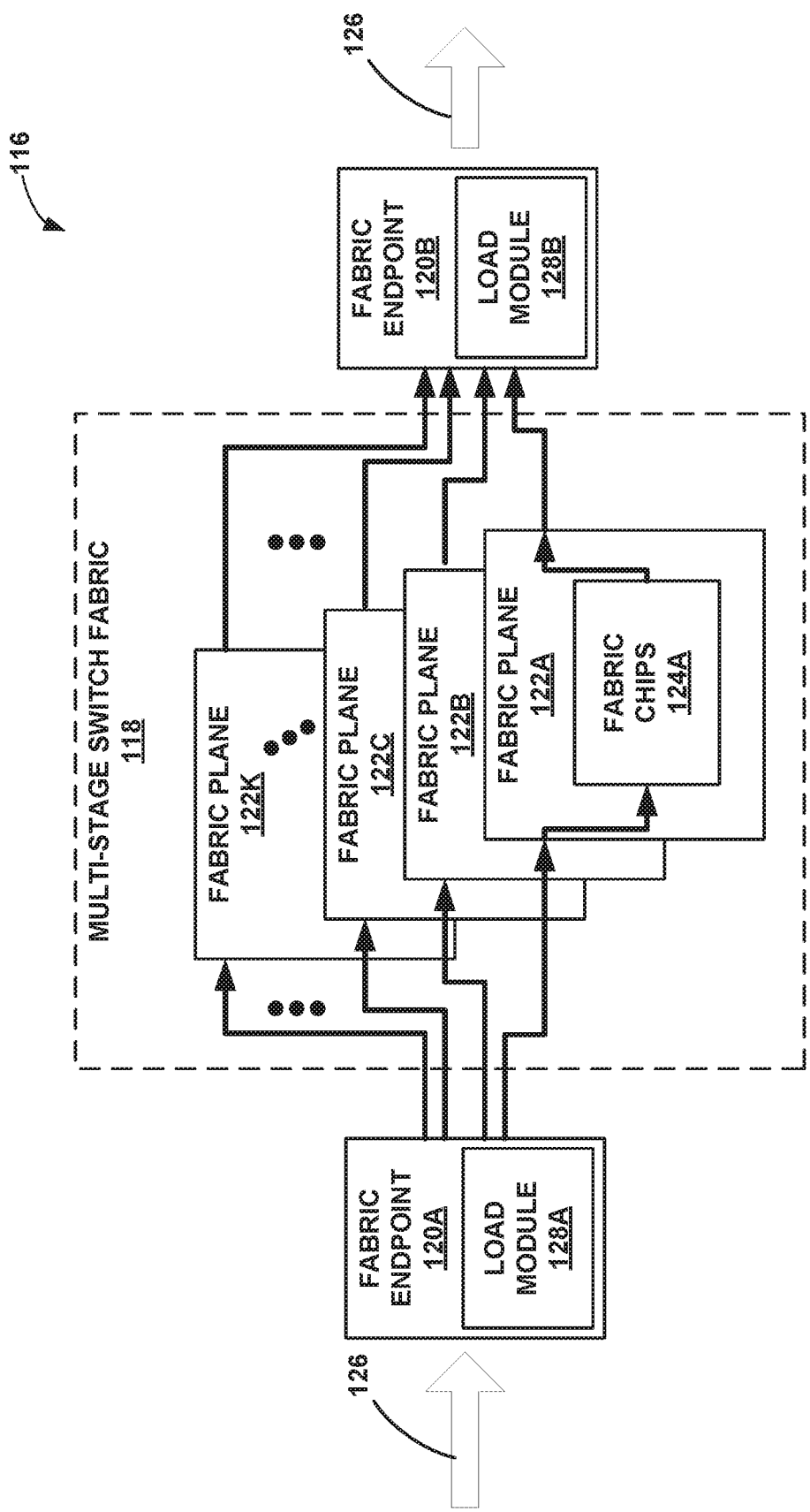
FIG. 3 is a block diagram illustrating an example of a switching system according to techniques described herein.

FIG. 3 is a block diagram illustrating an example of a switching system according to techniques described herein. Multi-stage switch fabric 118 ("fabric 118") of switching system 116 may represent an example instance of switch fabric 26 of the network device 4 of FIG. 2. Fabric endpoints 120A, 120B (collectively, "fabric endpoints 120") of switching system 116 are separately coupled to each of fabric planes 122A-122K of multi-stage switch fabric 118 to operate as sources and/or destinations of data units (e.g., cells) switched by fabric 118. In the illustrated example, fabric endpoint 120A sends, ingresses, originates, or otherwise sources packets 126 for switching via multi-stage switch fabric 118 to fabric endpoint 120B that receives, egresses, consumes, sinks, or otherwise serves as a destination for packets 126. Although FIG. 3 illustrates only two fabric endpoints, switching system 116 may include many hundreds of fabric endpoints, or more. In some examples, switching system 116 includes 96 fabric endpoints in communication with multi-stage switch fabric 118. In such examples, any given fabric endpoint 120 may receive cells sourced by 96 different fabric endpoints 120.

Although each of fabric endpoints 120 typically operates as both a source (e.g., ingress) and a destination (e.g., egress) for cells, any of fabric endpoints 120 may be either a source or a destination for cells in various instances. In some examples, fabric endpoints 120 may each represent a packet forwarding engine or other forwarding unit such that fabric endpoints 120 collectively implement a distributed forwarding plane for a packet switching device (e.g., network device 4). In some examples, fabric endpoints 120 may represent fabric interfaces for servers or other hosts (e.g., virtual machines) that exchange packets for a distributed application via fabric 118. Fabric endpoints 120 may include respective switch fabric interfaces or "switch interfaces" (SIs—not shown) to provide queuing for cells being switched via fabric 118, among other operations.

In this example, multi-stage switch fabric 118 includes a plurality of operationally independent, parallel switch fabric planes 122A-122K (illustrated as "fabric planes 122A-122K") and referred to herein collectively as "fabric planes 122"). The number of fabric planes 122 may be any number, dependent upon the respective capacities of the fabric planes 122 and the fabric bandwidth needed. Fabric planes 122 may include 4, 5, or 18 planes, for instance. In some examples, fabric plane 122K operates as a backup or spare fabric plane to the remaining fabric planes 122. Each of fabric planes 122 includes similar components for implementing an independent Clos or other multi-stage switch network (e.g., a Benes network) to provide independent switching bandwidth to fabric endpoints 120, said components and functionality being described hereinafter primarily with respect to fabric plane 122A. Fabric planes 122 are operationally independent in that a failure of one of fabric planes 122 does not affect the switching ability of the remaining, operational fabric planes. Each of fabric planes 122 may provide non-blocking connectivity. Additional details regarding an example of a multi-stage switch fabric having a plurality of switch planes are found in Pradeep S. Sindhu, U.S. Pat. No. 7,102,999, entitled "Switching Device" and filed Nov. 24, 1999, which is incorporated by reference in its entirety.

Each of fabric planes 122 includes an input port coupled to fabric endpoint 120A and an output port coupled to fabric endpoint 120B. Although only one ingress fabric endpoint 120A and one egress fabric endpoint 120B is illustrated for simplicity, each fabric plane 122 typically includes multiple input ports and output ports coupled to respective fabric endpoints. When a fabric endpoint 120A obtains a packet, the fabric endpoint 120A performs a lookup operation to determine fabric endpoint 120B (in this example) is a destination for the packet. Obtaining a packet may refer to receiving a packet from the network or host, or originating a packet, for instance. Fabric endpoint 120A optionally divides the packet into cells and forwards the packet/cells across multi-stage fabric 118 to fabric endpoint 120B. Fabric endpoint 120A selects different fabric planes 122 to switch the cells to distribute the bandwidth load across the fabric planes 122.

Fabric endpoints 120A, 120B may employ a request/grant protocol to transmit a data cell across fabric 118. In such cases, ingress fabric endpoint 120A transmits a request across fabric 118 to the egress fabric endpoint 120B. Fabric endpoint 120A transmits each such request across a different one of fabric planes 122 in a round-robin or other balancing order to fairly distribute the transport load as described in further detail below. In response to receiving the request, fabric endpoint 120B transmits a grant to the fabric endpoint 20A across the same fabric plane 122 on which fabric endpoint 120B received the corresponding request. In response to receiving the grant, fabric endpoint 120A transmits the data cell to the fabric endpoint 120B across the same fabric plane 122 on which fabric endpoint 120A issued the corresponding request.

As noted above, each of fabric planes 122 may include similar components to perform similar multi-stage switch functionality. Fabric plane 122A, as an example, includes a plurality of fabric chips 124 coupled by fabric chip-to-chip links (CCLs-not shown) to implement a multi-stage switch fabric for the fabric plane 122A. Fabric chips 124A may be distributed among various switching devices, chassis, etc., of the switching system 116. Each of fabric chips 124A may include an application-specific integrated circuit (ASIC) and may be referred to as a "fabric ASIC." Each fabric chip may perform the switching functionality for one or more stage switches and may represent, e.g., a crossbar switch.

In accordance with techniques described herein, fabric endpoints 120A-120B includes respective load modules 128A-128B (collectively referred to as "load modules 128") to selectively load balance data cells across fabric 118 in accordance with the techniques of this disclosure. Load modules 128 may operate as described with respect to load modules 32 of FIG. 2. In the example of FIG. 3, selective load balancing logic is located within fabric endpoints 120 and may not be present in packet processors 24 as in FIG. 2.

Figure 4:
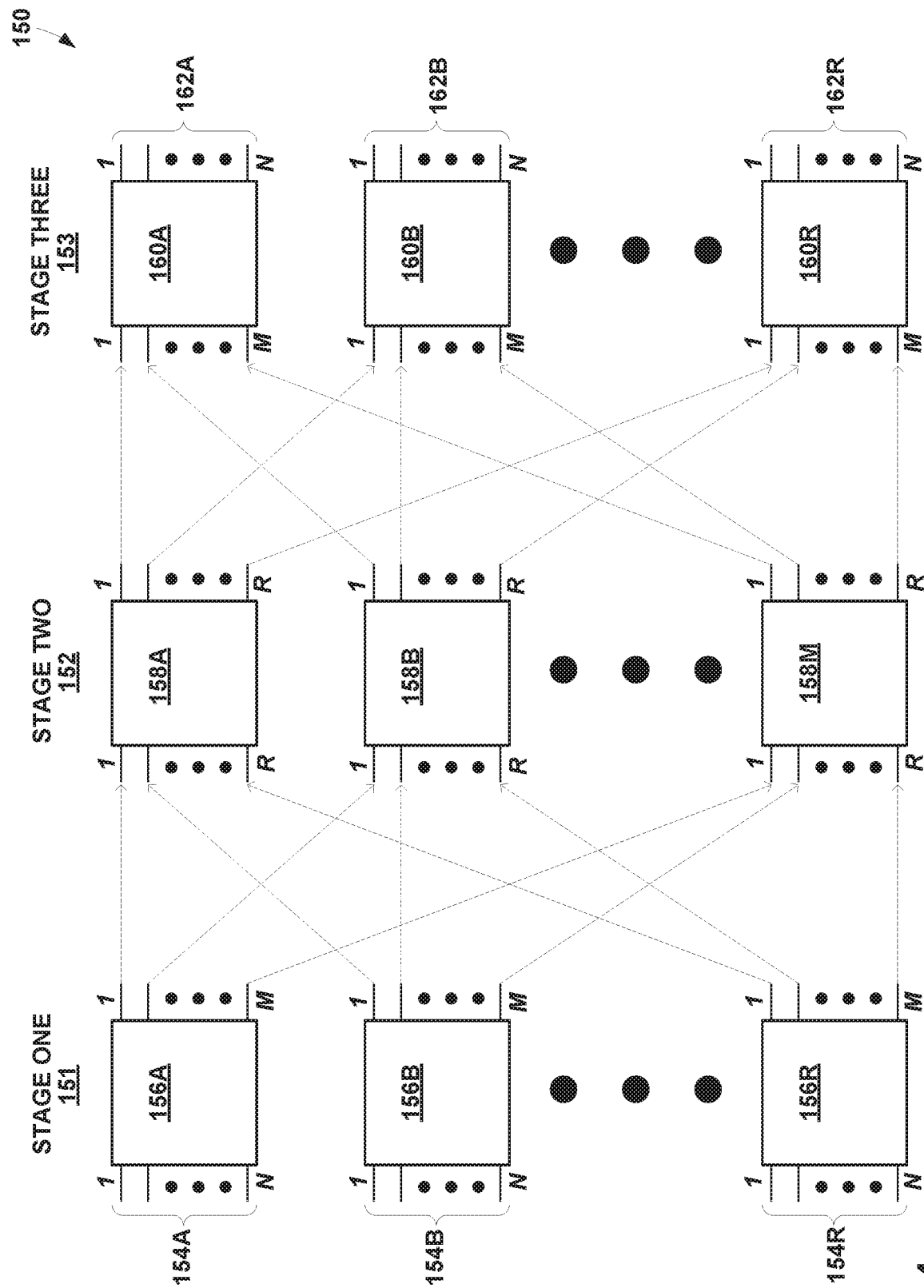
FIG. 4 is a block diagram illustrating a logical representation of a three-stage switching network that operates in accordance with techniques described herein.

FIG. 4 is a block diagram illustrating a logical representation of an example three-stage switching network 150 (or "switch fabric 150") that operates in accordance with some aspects of the techniques described herein. Three-stage network 150 may logically represent switch fabric 26 of FIG. 2, switch fabric 118 of FIG. 3, or another switch fabric in which components or devices are interconnected to provide a multi-stage switch fabric. The three stages of the example network 150 of FIG. 4 include: stage one 151 consisting of crossbar switches 156A-156R (collectively "switches 156"), stage two 152 consisting of crossbar switches 158A-158M (collectively "switches 158"), and stage three consisting of crossbar switches 160A-160R (collectively "switches 160"). Switches 156 receive data packets via inputs 154A-154N (collectively "inputs 154"); there are a total of N×R inputs 154 in this example. Switches 160 send the data packets via output ports 162A-162N (collectively "outputs 162"); there are a total of N×R outputs 162 in this example.

As shown in FIG. 4, stage one 151 and stage three 153 each include R crossbar switches, while stage two 152 includes M crossbar switches. Three-stage network in coupled to N inputs and N outputs, thus completing the characterization of the Clos network. The integer values for M and N define blocking characteristics of three-stage switching network 150. For example, stage two 152 may include more crossbar switches than stage one 151 and stage three 153 (i.e., M>R) to reduce or eliminate the possibility that an open one of inputs 154 could be blocked from an open one of outputs 162.

Each of switches 156, 158, 160 may be implemented by a fabric chip. In some cases, corresponding stage one switches 156 and stage three switches 160 (e.g., switch 156A and switch 160A) may be implemented by a same fabric chip.

To establish a path (and corresponding subchannel) through network 150 from one of inputs 154 to the intended output 162, the one of switches 156 associated with the receiving input 154 determines an available stage two 152 switch 158 that allows a connection path to the stage three 153 switch 160 including the intended output 162. That is, for example, each subchannel may correspond to a respective fabric path of switch fabric 150 to one of outputs 162 (e.g., a fabric endpoint). For example, assume a packet received by switch 156A is to be relayed to one of outputs 162A on switch 160A. Switch 156A selects any of switches 158 with an open connection to both switch 156A and switch 160A. Assume switch 156A selects switch 158B. Once switch 158B receives the data packet, switch 158B determines an available path to switch 160A and forwards the data packet to switch 160A. For example, switch 158B may have more than one open path to switch 160A. An ingress fabric endpoint may use different open paths from one of inputs 154 to the intended output 162 to switch consecutive cells (by sequence number), each open path having a different latency. As a result, fabric cells for the cell sequence from the ingress fabric endpoint may arrive out of order at the egress fabric endpoint.

While generally described as a three-stage switch network such as network 150, in other examples fabric planes described herein may contain different another type of switch architecture. For example, the second stage in a three-stage network may be replaced with another three-stage network, thereby forming a five-stage network.

Figure 5:
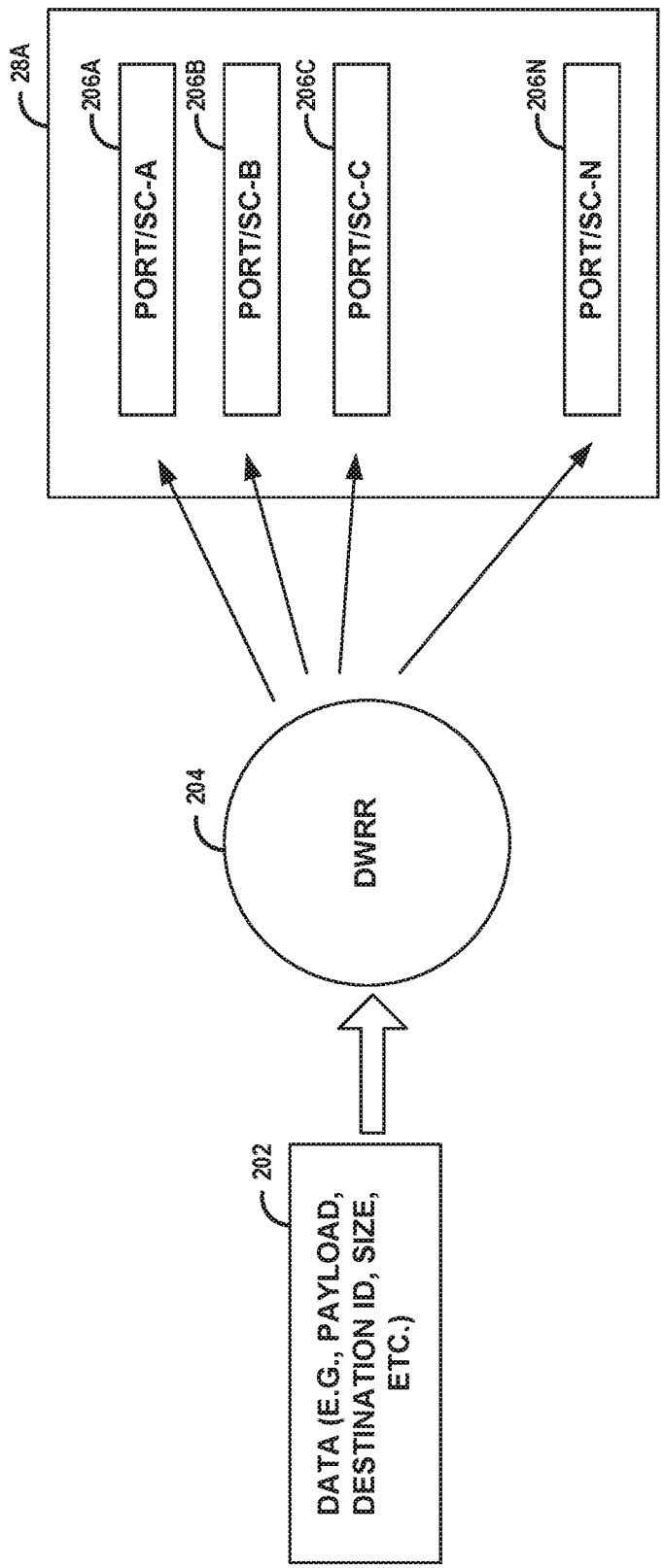
FIG. 5 is a block diagram illustrating an example fabric data flow according to techniques described in this disclosure.

FIG. 5 is a block diagram illustrating an example fabric data flow according to techniques described in this disclosure. In fabric output, a single stream of data 202 may be sprayed over multiple fabric subchannels. Data 202 may come in the form of cells which are variable in size. Each cell may include a destination PFE number indicating a fabric endpoint. Packet processor 24A may use a Deficit Weighted Round Robin (DWRR) 204 to spray data 202 going to a single destination PFE (e.g., fabric endpoint) over subchannels such that data 202 is relatively equally sprayed among the subchannels. More specifically, for example, packet processor 24A may output cells 206A-206N (collectively referred to as "cells 206") for storage at memory 28A. In this example, each one of cells 206 is assigned to a respective subchannel. For instance, cell 206A may be assigned to a first subchannel (e.g., subchannel A ("SC-A"), cell 206B may be assigned to a second subchannel (e.g., subchannel A ("SC-B"), and so forth. In some examples, a subchannel may be also referred to as a port.

Packet processor 24A may retrieve data for each one of cells 206 from memory 28A and output the data for a respective one of cells 206 at a respective subchannel. For instance, packet processor 24A may retrieve data for cell 206A from memory 28A and output data for cell 206A at a first subchannel, retrieve data for cell 206B from memory 28A and output data for cell 206B at a second subchannel, and so forth.

Each subchannel may be associated with a respective fixed rate. For example, packet processor 24A may output the data for a respective one of cell 206 at a respective subchannel at a respective fixed rate. For instance, packet processor 24A may output data for cell 206A at a first subchannel at a first fixed rate, output data for cell 206B at a second subchannel at a second fixed rate, and so forth. In some examples, one or more subchannels may be assigned a respective fixed rate that is different from another fixed rate of the subchannels. In other examples, all subchannels may be assigned a particular fixed rate. In the example of FIG. 5, while load module 32A selectively load balanced incoming network traffic across switch fabric subchannels, any combination of load modules 32 may be configured to selectively load balance incoming network traffic across switch fabric subchannels. In the example of FIG. 5, while packet processor 24A selectively load balanced incoming network traffic across switch fabric subchannels, fabric endpoints 120 of FIG. 3 may be configured to selectively load balance incoming network traffic across switch fabric subchannels. In some examples packet processor 24A may comprise processing circuitry configured to selectively load balance incoming network traffic across switch fabric subchannels. In some examples, one or more of fabric endpoints 120 may comprise processing circuitry configured to selectively load balance incoming network traffic across switch fabric subchannels.

Figure 6:
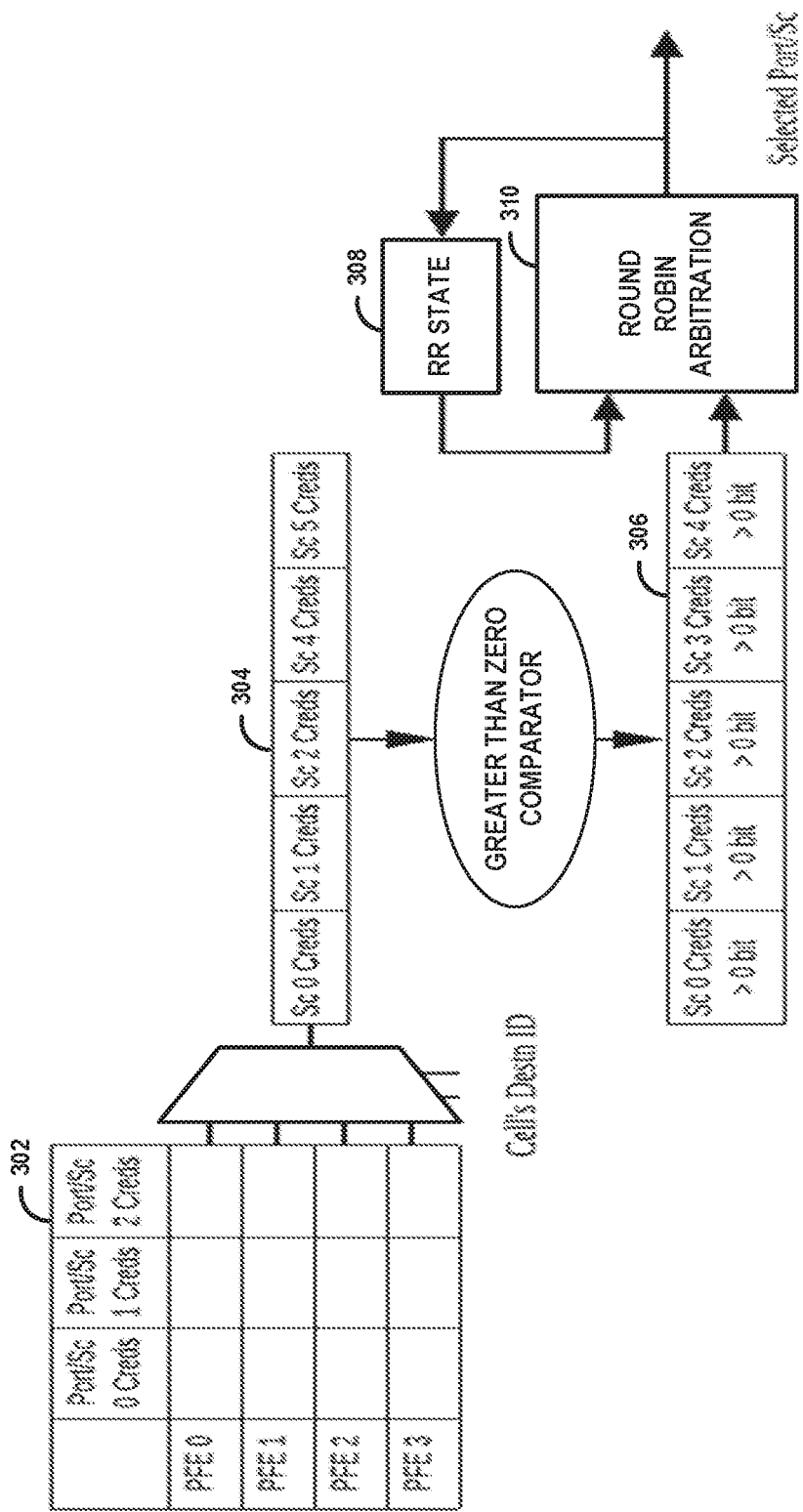
FIG. 6 is a block diagram illustrating an example round-robin subchannel arbitration according to techniques described in this disclosure.

FIG. 6 is a block diagram illustrating an example round-robin subchannel arbitration according to techniques described in this disclosure. Each port and/or subchannel may buffer data in memory 28A by maintaining a link-list 302. In some examples, packet processor 24A may maintain context for each PFE in link-list 30, which may be used by packet processor 24A to make decisions about which subchannel to transmit data on such that the data is transmitted uniformly across subchannels. Again, an incoming data-stream may have cells of different sizes. Thus, packet processor 24A may assign a subchannel number for cells of an incoming data-stream by running a DWRR. Packet processor 24A may maintain a credit count per subchannel/port per Destination ID. Whenever data is received, the destination ID of the packet/cell is included with the data. As used herein, a credit count may correspond to a number of bytes.

Packet processor 24A may take the credit counts of all subchannels of the incoming Destination ID to generate a greater than zero vector 306. More specifically, for example, packet processor 24A may generate a credit vector 304 for a particular destination ID (e.g., fabric endpoint) using a multiplexer operation. Said differently, for example, packet processor 24A may pick all the subchannels credit counts for a particular destination (e.g., fabric endpoint) to generate credit vector 304. In this example, packet processor 24A may generate greater than zero vector 306 for the particular fabric endpoint using credit vector 304 using a comparator operation. Said differently, for example, packet processor 24A may compare credit counts for each subchannel to incoming packet cell sizes. For instance, packet processor 24A may assign a logical '1' value to a position of greater than zero vector 306 corresponding to a particular channel when a credit count of the particular subchannel at credit vector 304 is greater than zero after subtracting an incoming packet cell size from a credit count of the particular subchannel at credit vector 304. In this example, packet processor 24A may assign a logical '0' value to a position of greater than zero vector 306 corresponding to the particular channel when the credit count of the particular subchannel at credit vector 304 is not greater than zero after subtracting an incoming packet cell size from a credit count of the particular subchannel at credit vector 304.

Packet processor 24A may run a Round Robin (RR) arbitration 310 on greater than zero vector 306 to select a subchannel such that data is transmitted uniformly across subchannels. Said differently, for example, packet processor 24A may perform round robin arbitration 310, which walks through all candidate subchannels and selects a single subchannel to receive a next cell to be transmitted. For example, packet processor 24A may order (e.g., numerically, randomly, etc.) the subchannels such that the last selected subchannel (e.g., incoming round robin state) is ranked last in the order of subchannels. Packet processor 24A may select a subchannel ordered after the last selected subchannel that has a logical '1' value in the greater than zero vector 306. Said differently, for example, packet processor 24A may mark a pointer to bit '0' corresponding to a first subchannel and move the pointer to bit '1' corresponding to a second subchannel if the first subchannel does not have credits for transmitting the next cell.

Packet processor 24A may update the round robin state 308 of the incoming Destination ID e.g., last selected subchannel) with the subchannel number selected. Packet processor 24A may update the credit count of the selected subchannel of the Destination ID. If all the subchannels' credit counts go negative for that particular destination ID, then packet processor 24A may replenish all the subchannels' credits. In the example of FIG. 6, while load module 32A selectively load balanced incoming network traffic across switch fabric subchannels, any combination of load modules 32 may be configured to selectively load balance incoming network traffic across switch fabric subchannels.

Figure 7:
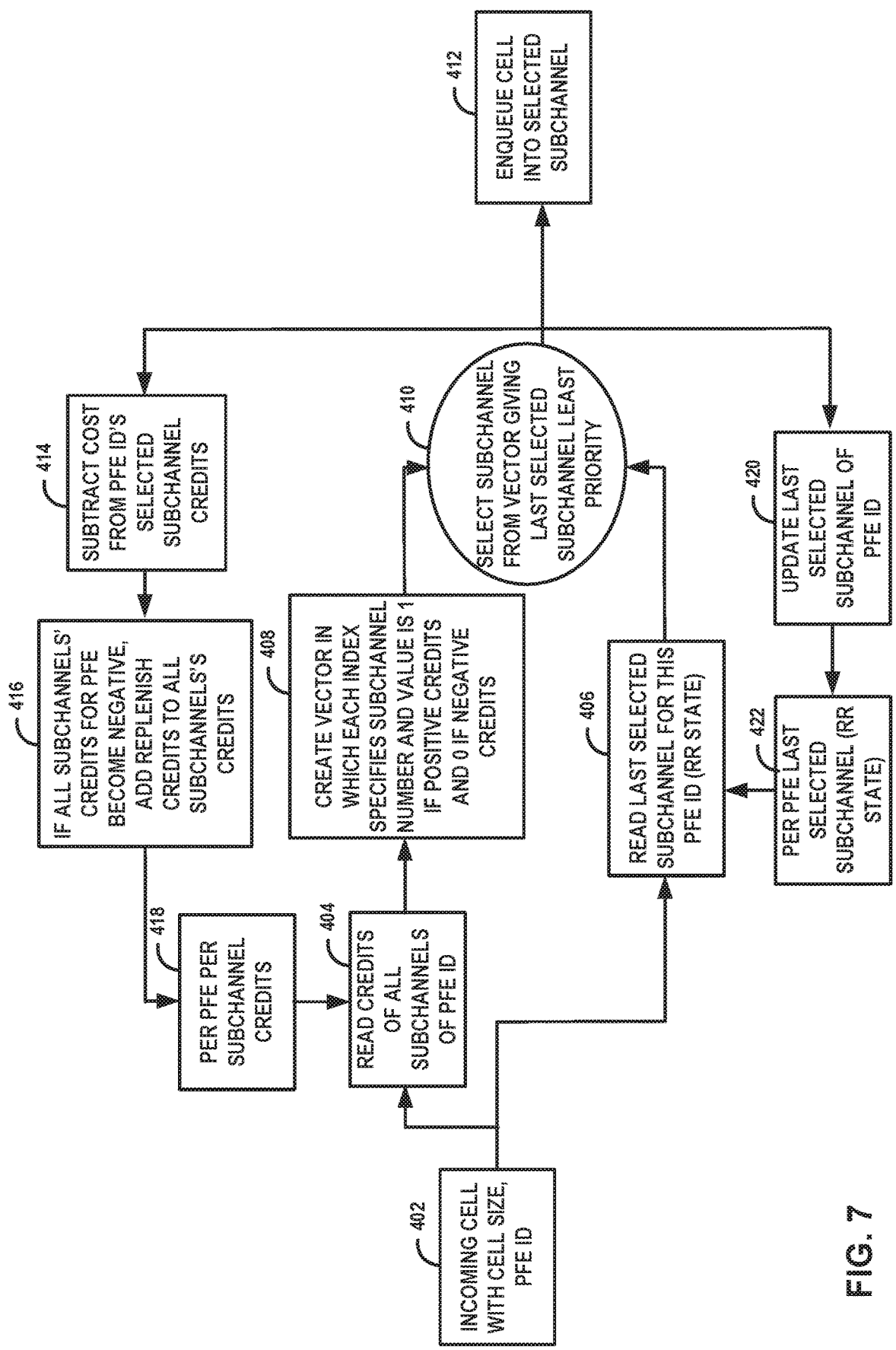
FIG. 7 is a flowchart illustrating an example round-robin subchannel selection according to techniques described in this disclosure.

FIG. 7 is a flowchart illustrating an example round-robin subchannel selection according to techniques described in this disclosure. Although described in terms of operations being performed by packet processors 24, in some examples the operations may be performed within the switch fabric, such as at a fabric endpoint. Initially, packet processor 24A receives an incoming cell, with cell size, and PFE ID (402). Packet processor 24A reads credit counts of all subchannels of the PFE ID (404) and reads the last selected subchannel for this PFE ID (RR state) (406). Packet processor 24A creates a vector (e.g., greater than zero vector 306 of FIG. 3) in which each index specifies a subchannel number and the value is one if positive credits and zero if negative credits after subtracting the cell size (408). In some examples, packet processor 24A may store the vector. Packet processor 24A selects a subchannel from the vector giving the last selected subchannel the least priority (410). Packet processor 24A enqueues the cell into the selected subchannel (412).

Packet processor 24A subtracts a cost from the PFE ID's selected subchannel credits (414). Packet processor 24A adds replenish credits to all subchannels's credits if all subchannnels' credits for the PFE become negative (416) to generate per PFE subchannel credits (418). Additionally, packet processor 24A updates the last selected subchannel of the PFE ID (420) to generate a per PFE last selected subchannel (RR state) (422). In the example of FIG. 7, while load module 32A selectively load balanced incoming network traffic across switch fabric subchannels, any combination of load modules 32 may be configured to selectively load balance incoming network traffic across switch fabric subchannels.

Figure 8:
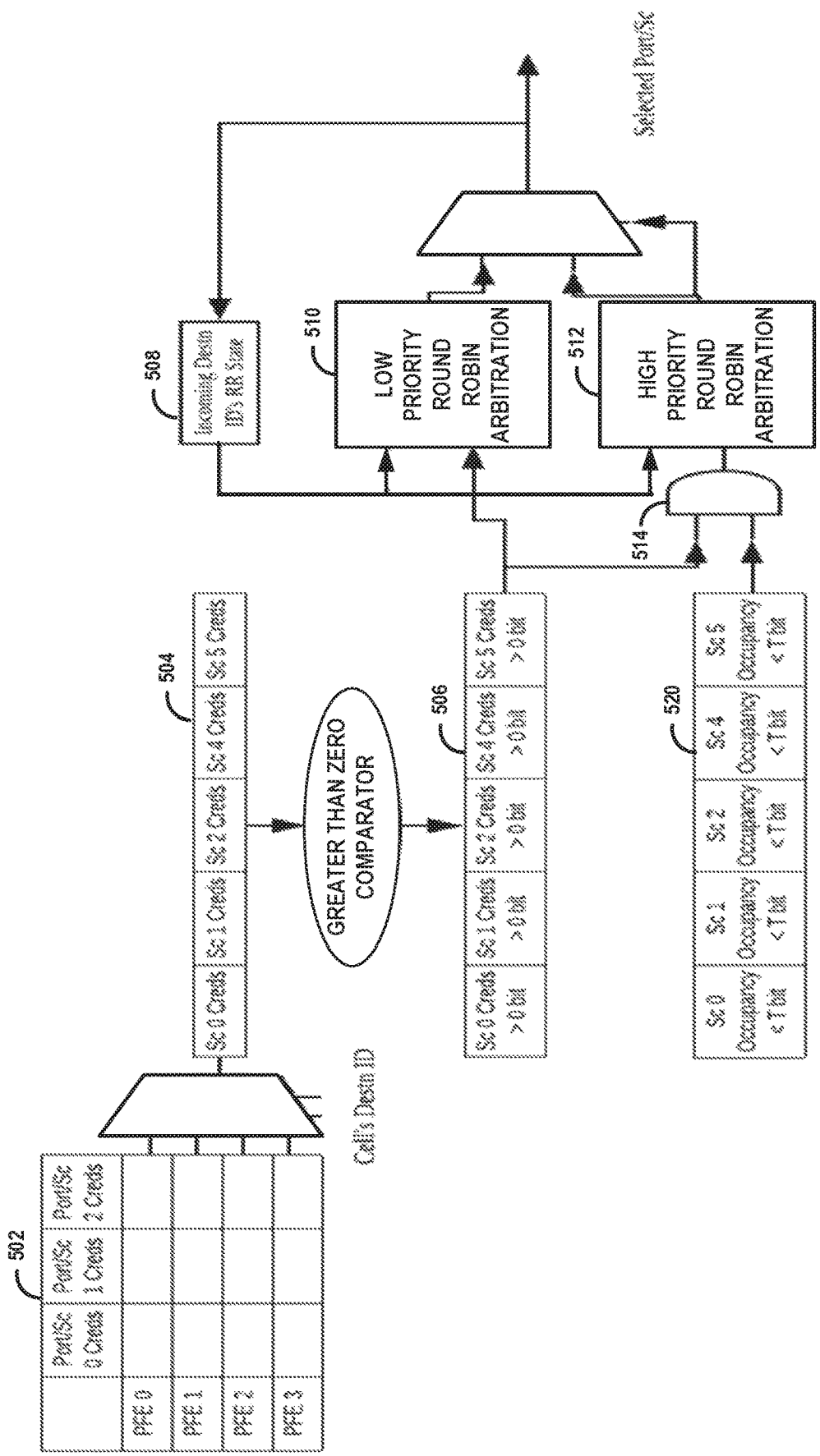
FIG. 8 is a block diagram illustrating an example low priority round-robin arbitration and high priority round-robin arbitration according to techniques described in this disclosure.

FIG. 8 is a block diagram illustrating an example low priority round-robin arbitration and high priority round-robin arbitration according to techniques described in this disclosure. Because low priority round robin arbitration 510 is run on per-destination ID basis, multiple destination ID's round robin pointer may align on a single subchannel/port and cause a build-up in memory 28A. The synchronization causing memory 28A to fill up is also increased as the number of destination PFEs increases. The space in memory 28A is taken up by one or more subchannels and cause a head of line blocking for other subchannels. This head of line blocking may cause some subchannels to "run-dry." Rather than relying on a larger memory 28A, the example of FIG. 8 includes a high priority round robin arbitration 512. The example of FIG. 8 helps to reduce or eliminate head of line blocking without increasing the size of memory 28A and also without compromising the Per-Destination ID's SC spray (e.g., data coming for a destination ID being sprayed across all ports/SC according to weight programmed).

In the example of FIG. 8, packet processor 24A may perform a low priority round robin arbitration 510 and a high priority round robin arbitration 512. The low priority round robin arbitration 510 may be similar to the round robin arbitration 310 illustrated in FIG. 6. For example, packet processor 24A may maintain link-list 502, which specifies a credit count for each PFE ID (e.g., fabric endpoint), generate credit vector 504 for a particular destination ID (e.g., fabric endpoint) using a multiplexer operation, and generate greater than zero vector 506 for the particular fabric endpoint using credit vector 504 and using a comparator operation.

In the example of FIG. 8, packet processor 24A maintains a per-subchannel occupancy 520 of memory 28A across all destination IDs. Packet processor 24A may be configured (e.g., by a human administrator) with occupancy threshold, T. Said differently, for example, occupancy threshold T may be selected by one or more of the following, a characterization, a simulation, or another factor. Occupancy threshold T may be configurable and/or programmable. In some examples, occupancy threshold T may be fixed through the life of an application. Packet processor 24A may create a vector for subchannels having occupancy less than the programmed value T. For example, packet processor 24A may set a bit corresponding to a subchannel to logical '1' if the subchannel has total occupancy less than T and reset the bit corresponding to the subchannel to logical '0' if the subchannel has total occupancy of not less than T.

When performing high priority round robin arbitration 512, packet processor 24A performs a bit-wise AND operation 514 with per-subchannel occupancy 520 and greater than zero vector 506. The resulting vector acts as an input for high priority round robin arbitration 512. For example, to select a subchannel, packet processor 24A may determine the credit count assigned to the selected subchannel in greater than zero vector 506 is greater than a credit threshold (e.g., zero) and determine per-subchannel occupancy 520 for the selected subchannel is less than an occupancy threshold (e.g., T). Said differently, for example, packet processor 24A may pick the next subchannel that satisfies both the greater than a credit threshold and the occupancy threshold (e.g., T). In this example, if the next subchannel does not satisfy both the greater than a credit threshold and the occupancy threshold (e.g., T), then packet processor 24A may move to the next subchannel.

More specifically, for example, packet processor 24A may run round robin arbitration on the resulting vector output by the bit-wise AND operation 514 and selects a subchannel such that data is transmitted uniformly across subchannels. For example, packet processor 24A may order (e.g., numerically, randomly, etc.) the subchannels such that the round robin state 508 (e.g., last selected subchannel) is ranked last in the order of subchannels. In this example, packet processor 24A may select a subchannel ordered after the round robin state 508 that has a logical '1' value in the greater than zero vector 506 and a logical '1' value in the per-subchannel occupancy 520.

If high priority round robin arbitration 512 generates a valid subchannel, packet processor 24A selects the subchannel generated using high priority round robin arbitration 512 for enqueuing the data. In some examples, if none of the high priority subchannels are eligible for selection, packet processor 24A may use low priority round robin arbitration 510. Packet processor 24A updates the round robin state with the selected subchannel. In this example, packet processor 24A ignores subchannel selected by the low priority round robin arbitration 510. If the input vector to high priority round robin arbitration 512 is all 0s, packet processor 24A may enqueue using the subchannel generated with low priority round robin arbitration 510.

Packet processor 24A may update, after selecting a subchannel, per-subchannel occupancy 520 for the selected subchannel. For example, packet processor 24A may determine an indication of an occupancy (e.g., a number of bytes reserved in memory 28A) for the data for the cell in memory 28A. In this example, packet processor 24A may modify an entry in a table of occupancy per-subchannel and per destination identifier that corresponds to the selected subchannel and the fabric endpoint using the indication of the occupancy for the data for the cell. For instance, packet processor 24A may add a number of bytes reserved in memory 28A for storing the data for the cell to an entry in per-subchannel occupancy 520 that corresponds to the selected subchannel.

Packet processor 24A may update, after selecting the subchannel, credit counts for each subchannel. For example, packet processor 24A may determine a credit cost for the data for the cell. For instance, packet processor 24A may determine a credit cost as a number of credits corresponding to a number of bytes for the data for the cell. In this example, packet processor 24A may modify an entry in link-list 502 that corresponds to the selected subchannel and the fabric endpoint using the credit cost. For instance, packet processor 24A may subtract the credit cost from an entry in link-list 502 that corresponds to the selected subchannel and the fabric endpoint. In some examples, packet processor 24A may determine link-list 502 indicates that each subchannel for the fabric endpoint has negative credits. In this example, in response to determining link-list 502 indicates that each subchannel for the fabric endpoint has negative credits, packet processor 24A may set, for each subchannel, an entry in link-list 502 that corresponds to a respective subchannel and the fabric endpoint to a respective replenished credit count. Each respective replenished credit count may be preconfigured, for example, by a human administrator.

The techniques to selectively load balance incoming network traffic across switch fabric subchannels illustrated in FIGS. 1-8 may lower the buffer requirement of the memory and may help to avoid a condition where a subchannel runs dry. The techniques to selectively load balance incoming network traffic across switch fabric subchannels illustrated in FIGS. 1-8 may also help to maintain the sanctity of DWRR (e.g., spraying equal amount of Bytes of traffic on all subchannels/ports) as credits greater than zero is used to run both RRs. In the example of FIG. 8, while load module 32A selectively load balanced incoming network traffic across switch fabric subchannels, any combination of load modules 32 may be configured to selectively load balance incoming network traffic across switch fabric subchannels.

Figure 9:
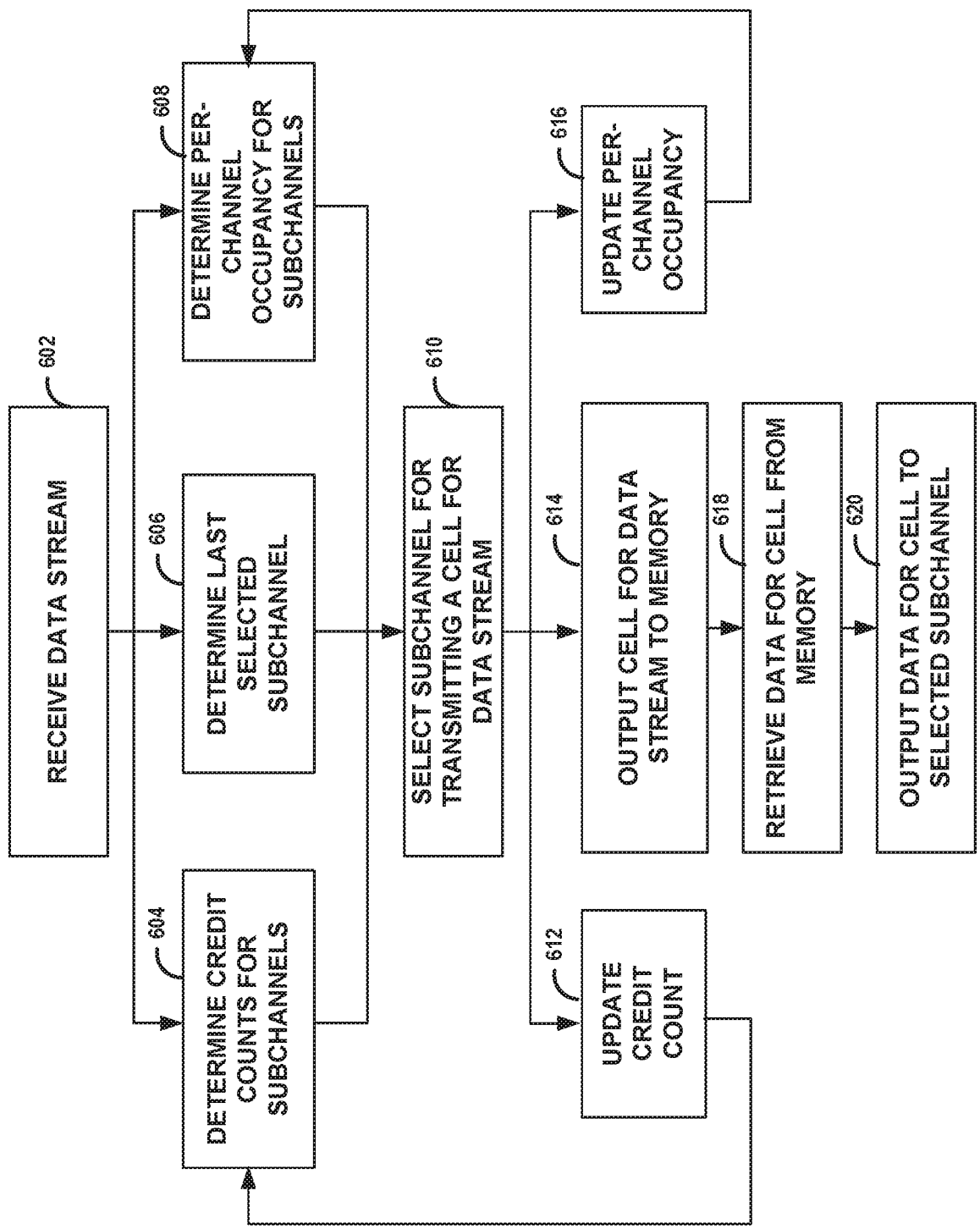
FIG. 9 is a flowchart illustrating an example low priority round-robin arbitration and high priority round-robin arbitration according to techniques described in this disclosure.

FIG. 9 is a flowchart illustrating an example low priority round-robin arbitration and high priority round-robin arbitration according to techniques described in this disclosure. Initially, packet processor 24A receives a data stream (602). Although described in terms of operations being performed by packet processors 24, in some examples the operations may be performed within the switch fabric, such as at a fabric endpoint. Packet processor 24A determines credit counts for subchannels (604), determines a last selected subchannel (606), and determines per-channel occupancy for the subchannels (608). For example, packet processor 24A determines credit counts for subchannels using credit vector 506, determines a last selected subchannel as round robin state 508, and determines per-channel occupancy for the subchannels using per-subchannel occupancy 520.

Packet processor 24A selects a subchannel for transmitting a cell for the data stream (610). For example, packet processor 24A selects a subchannel for transmitting a cell using low priority round robin arbitration 510 and/or high priority round robin arbitration 512. Packet processor 24A updates the credit count (612), outputs cell for the data stream to memory 28A (614), and updates per-channel occupancy (616). Packet processor 24A may also update the last selected subchannel. Packet processor 24A retrieves the data for the cell from memory 28A (618). Packet processor 24A outputs the data for the cell to the selected subchannel (620). In the example of FIG. 9, while load module 32A selectively load balanced incoming network traffic across switch fabric subchannels, any combination of load modules 32 may be configured to selectively load balance incoming network traffic across switch fabric subchannels.

Figure 10:
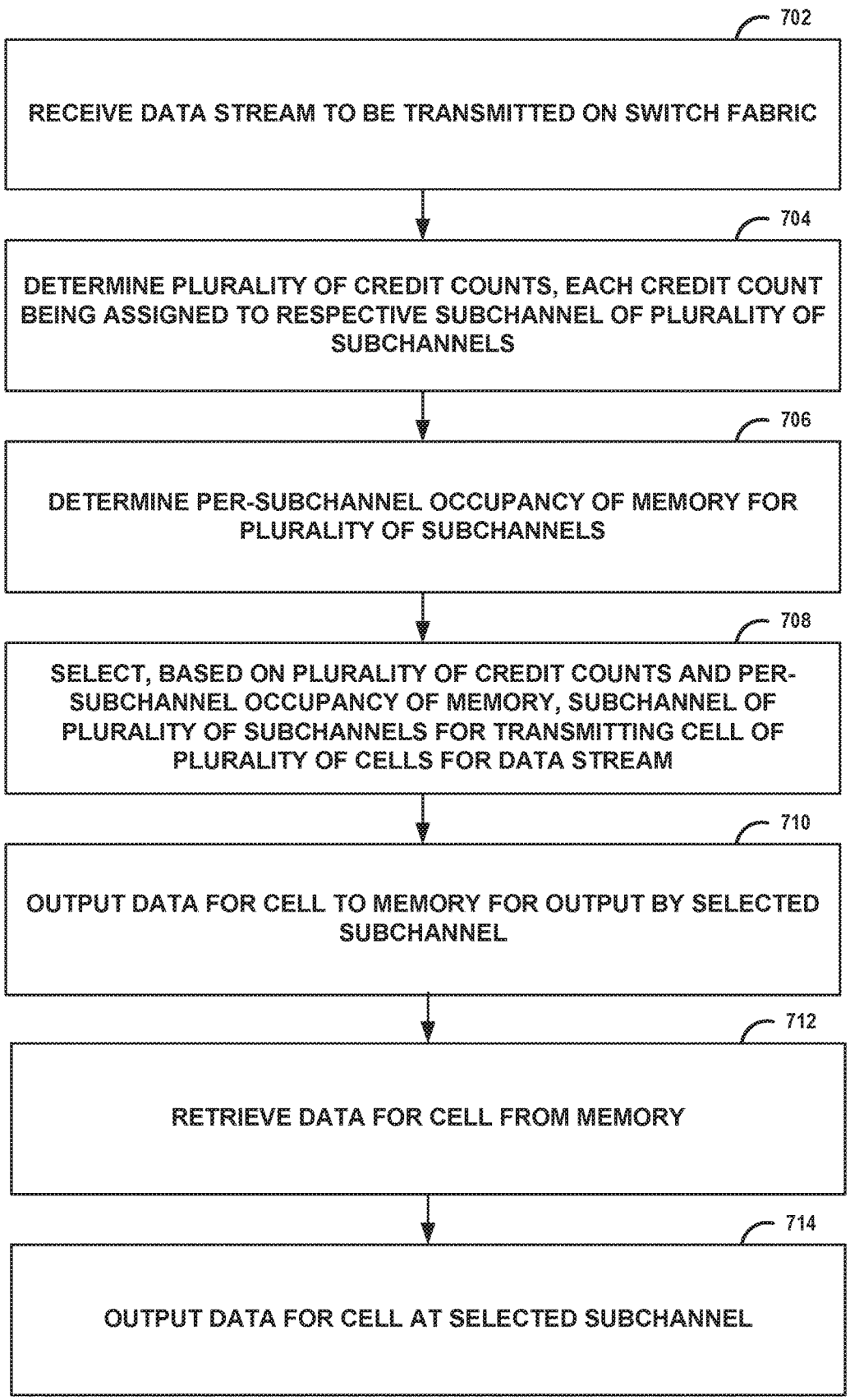
FIG. 10 is a flowchart illustrating an example operation to selectively load balance incoming network traffic across switch fabric subchannels according to techniques described in this disclosure.

FIG. 10 is a flowchart illustrating an example operation to selectively load balance incoming network traffic across switch fabric subchannels according to techniques described in this disclosure. Although described in terms of operations being performed by packet processors 24, in some examples the operations may be performed within the switch fabric, such as at a fabric endpoint. Initially, packet processor 24A receives data stream to be transmitted on switch fabric 26 (702). Packet processor 24A determines a plurality of credit counts, each credit count being assigned to a respective subchannel of a plurality of subchannels, each subchannel of the plurality of subchannels corresponding to a respective fabric path through switch fabric 26 from an ingress fabric endpoint to an egress fabric endpoint of the plurality of fabric endpoints (704). Packet processor 24A determines per-subchannel occupancy of memory 28A for the plurality of subchannels (706). Packet processor 24A selects, based on the plurality of credit counts and the per-subchannel occupancy of memory 28A, a subchannel of the plurality of subchannels for transmitting a cell of a plurality of cells for the data stream (708). Packet processor 24A outputs data for the cell to memory 28A for output by the selected subchannel (710). Packet processor 24A retrieves the data for the cell from memory 28A (712) and outputs the data for the cell at the selected subchannel (714). In the example of FIG. 10, while load module 32A selectively load balanced incoming network traffic across switch fabric subchannels, any combination of load modules 32 may be configured to selectively load balance incoming network traffic across switch fabric subchannels.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method comprising:
   receiving, by processing circuitry of a network device, a data stream to be transmitted on a switch fabric of the network device, the switch fabric coupling a plurality of packet processors to a plurality of fabric endpoints of the switch fabric;
   determining, by the processing circuitry, a plurality of credit counts, each credit count being assigned to a respective subchannel of a plurality of subchannels, each subchannel of the plurality of subchannels corresponding to a respective fabric path through the switch fabric from an ingress fabric endpoint to an egress fabric endpoint of the plurality of fabric endpoints;
   determining, by the processing circuitry, per-subchannel occupancy of a memory for the plurality of subchannels, wherein the per-subchannel occupancy indicates whether a number of bytes for each subchannel of the plurality of subchannels is less than an occupancy threshold;
   selecting, by the processing circuitry, a subchannel of the plurality of subchannels for transmitting a cell of a plurality of cells for the data stream in response to determining a credit count of the plurality of credit counts that is assigned to the selected subchannel is greater than a credit threshold for the selected subchannel and in response to determining that the per-subchannel occupancy indicates that the number of bytes for the subchannel is less than the occupancy threshold; and
   outputting, by the processing circuitry, data for the cell to the memory for output by the selected subchannel.

2. The method of claim 1, further comprising:
   retrieving, by the processing circuitry, after outputting the data for the cell to the memory, the data for the cell from the memory; and
   outputting, by the processing circuitry, the data for the cell at the selected subchannel.

3. The method of claim 1, wherein a packet processor of the plurality of packet processors comprises the processing circuitry.

4. The method of claim 1, further comprising:
   updating, by the processing circuitry and based on selecting the subchannel, the per-subchannel occupancy of the memory.

5. The method of claim 4, wherein updating the per-subchannel occupancy of the memory comprises:
   determining an indication of an occupancy for the data for the cell in the memory; and
   modifying an entry in a table of occupancy per-subchannel and per destination identifier that corresponds to the selected subchannel and the egress fabric endpoint using the indication of the occupancy for the data for the cell.

6. The method of claim 1, further comprising:
   updating, by the processing circuitry, after selecting the subchannel, the plurality of credit counts.

7. The method of claim 6, wherein updating the plurality of credit counts comprises:
   determining a credit cost for the data for the cell; and
   modifying an entry in a table of credits per-subchannel and per destination identifier that corresponds to the selected subchannel and the egress fabric endpoint using the credit cost.

8. The method of claim 7, wherein updating the plurality of credit counts comprises:
   determining the table indicates that each subchannel for the egress fabric endpoint has negative credits; and
   setting, for each subchannel of the plurality of subchannels, an entry in the table that corresponds to a respective subchannel and the egress fabric endpoint to a respective replenished credit count.

9. A network device comprising:
   a memory;
   a plurality of packet processors;
   a switch fabric coupling the plurality of packet processors to a plurality of fabric endpoints of the switch fabric; and
   processing circuitry configured to:
      receive a data stream to be transmitted on the switch fabric;
      determine a plurality of credit counts, each credit count being assigned to a respective subchannel of a plurality of subchannels, each subchannel of the plurality of subchannels corresponding to a respective fabric path through the switch fabric from an ingress fabric endpoint to an egress fabric endpoint of the plurality of fabric endpoints;

determine per-subchannel occupancy of the memory for the plurality of subchannels, wherein the per-subchannel occupancy indicates whether a number of bytes for each subchannel of the plurality of subchannels is less than an occupancy threshold;

select a subchannel of the plurality of subchannels for transmitting a cell of a plurality of cells for the data stream in response to a determination that a credit count of the plurality of credit counts that is assigned to the selected subchannel is greater than a credit threshold for the selected subchannel and in response to a determination that the per-subchannel occupancy indicates that the number of bytes for the subchannel is less than the occupancy threshold; and output data for the cell to the memory for output by the selected subchannel.

10. The network device of claim 9, wherein the processing circuitry is configured to:

retrieve, after outputting the data for the cell to the memory, the data for the cell from the memory; and output the data for the cell at the selected subchannel.

11. The network device of claim 9, wherein the ingress fabric endpoint comprises the processing circuitry.

12. The network device of claim 9, wherein a packet processor of the plurality of packet processors comprises the processing circuitry.

13. The network device of claim 9, wherein the processing circuitry is configured to:

update, based on selecting the subchannel, the per-subchannel occupancy of the memory.

14. The network device of claim 13, wherein, to update the per-subchannel occupancy of the memory, the processing circuitry is configured to:

determine an indication of an occupancy for the data for the cell in the memory; and modify an entry in a table of occupancy per-subchannel and per destination identifier that corresponds to the selected subchannel and the egress fabric endpoint using the indication of the occupancy for the data for the cell.

15. The network device of claim 9, wherein the processing circuitry is configured to:

update, after selecting the subchannel, the plurality of credit counts.

16. The network device of claim 15, wherein, to update the plurality of credit counts, the processing circuitry is configured to:

determine a credit cost for the data for the cell; and modify an entry in a table of credits per-subchannel and per destination identifier that corresponds to the selected subchannel and the egress fabric endpoint using the credit cost.

17. The network device of claim 16, wherein, to update the plurality of credit counts, the processing circuitry is configured to:

determine the table indicates that each subchannel for the egress fabric endpoint has negative credits; and set, for each subchannel of the plurality of subchannels, an entry in the table that corresponds to a respective subchannel and the egress fabric endpoint to a respective replenished credit count.

18. A non-transitory computer-readable storage medium comprising instructions for causing processing circuitry of a network device to:

receive a data stream to be transmitted on a switch fabric of the network device, the switch fabric coupling a plurality of packet processors to a plurality of fabric endpoints of the switch fabric;

determine a plurality of credit counts, each credit count being assigned to a respective subchannel of a plurality of subchannels, each subchannel of the plurality of subchannels corresponding to a respective fabric path through the switch fabric from an ingress fabric endpoint to an egress fabric endpoint of the plurality of fabric endpoints;

determine per-subchannel occupancy of a memory for the plurality of subchannels, wherein the per-subchannel occupancy indicates whether a number of bytes for each subchannel of the plurality of subchannels is less than an occupancy threshold;

select a subchannel of the plurality of subchannels for transmitting a cell of a plurality of cells for the data stream in response to a determination that a credit count of the plurality of credit counts that is assigned to the selected subchannel is greater than a credit threshold for the selected subchannel and in response to a determination that the per-subchannel occupancy indicates that the number of bytes for the subchannel is less than the occupancy threshold; and output data for the cell to the memory for output by the selected subchannel.

\* \* \* \* \*